United States Patent
Bergano et al.

(10) Patent No.: US 6,342,961 B1
(45) Date of Patent: Jan. 29, 2002

(54) METHOD AND APPARATUS FOR IMPROVING SPECTRAL EFFICIENCY IN WAVELENGTH DIVISION MULTIPLEXED TRANSMISSION SYSTEMS

(75) Inventors: Neal S. Bergano, Lincroft; Carl Davidson, Manalapan, both of NJ (US)

(73) Assignee: TyCom (US) Inc., Morristown, NJ (US)

(*) Notice: Subject to any disclaimer, the term of this patent is extended or adjusted under 35 U.S.C. 154(b) by 0 days.

(21) Appl. No.: 09/632,415

(22) Filed: Aug. 4, 2000

Related U.S. Application Data

(63) Continuation of application No. 09/031,018, filed on Feb. 26, 1998, now Pat. No. 6,134,033.

(51) Int. Cl.[7] .............................................. H04J 14/02
(52) U.S. Cl. ..................... 359/124; 359/122; 359/156; 359/133
(58) Field of Search ................................ 359/122, 124, 359/133, 156, 180

(56) References Cited

U.S. PATENT DOCUMENTS 5,841,557 A * 11/1998 Otsuka et al. ............... 359/122

* cited by examiner

*Primary Examiner*—Kinfe-Michael Negash

(57) ABSTRACT

A gain-clamped, optical amplifier includes a rare-earth doped fiber and a source of pump energy coupled to the rare-earth doped fiber. The doped fiber serves as a gain medium that is optically pumped by the pump source. A wavelength-selective optical feedback loop is coupled between input and output ports of the rare-earth doped fiber. The feedback loop supports a compensating laser signal, which is a pulsed signal located at a wavelength different from a signal wavelength.

27 Claims, 3 Drawing Sheets

# METHOD AND APPARATUS FOR IMPROVING SPECTRAL EFFICIENCY IN WAVELENGTH DIVISION MULTIPLEXED TRANSMISSION SYSTEMS

RELATED APPLICATIONS

This is continuation of application Ser. No. 09/031,018, filed Feb. 26, 1998, now U.S. Pat. No. 6,134,033.

FIELD OF THE INVENTION

The invention relates generally to wavelength division multiplexed transmission systems, and more particularly to a transmitter employed in wavelength division mulitplexed transmission systems which increases spectral efficiency by reducing four-wave mixing.

BACKGROUND OF THE INVENTION

Wavelength-division multiplexing is expected to be increasingly utilized in undersea and transcontinental terrestrial optical transmission systems due, in part, to the large bandwidth capacity such multiplexing provides. One way of increasing the total transmission capacity of such systems is to more efficiently use the available spectral bandwidth such as by decreasing the spacing between adjacent ones of the multiplexed channels. Unfortunately, wavelength division multiplexed transmission systems are susceptible to performance limitations due to polarization dependent effects such as cross-talk between the multiplexed channels. Cross-talk, which is primarily caused by the non-linear index of refraction of optical transmission fibers, increases as the channel spacing decreases. Four-wave mixing is one significant deleterious effect that produces cross-talk. Accordingly, reducing four-wave mixing while simultaneously increasing spectral efficiency would be desirable in wavelength division multiplexed optical transmission systems.

SUMMARY OF THE INVENTION

In accordance with the present invention, a method and apparatus is provided for transmitting an optical signal. The method includes the step of generating an optical signal that includes a plurality of optical channels, which are sequentially numbered from 1 to N from lowest to highest wavelength. A state-of-polarization of predetermined odd-numbered channels is oriented to be substantially orthogonal to a state of polarization of predetermined even-numbered channels by directing the predetermined odd-numbered channels and the predetermined even-numbered channels through orthogonally polarizing inputs of a polarization coupler. The odd-numbered channels and the even-numbered channels may be directed through first and second wavelength combiners, respectively, prior to orienting their states of polarization. The orthogonal relationship between the states of polarization of odd and even-numbered channels advantageously limits the four-wave mixing products that can be generated in the optical transmitter and the optical transmission path to which it is typically coupled.

DETAILED DESCRIPTION

Figure 1:
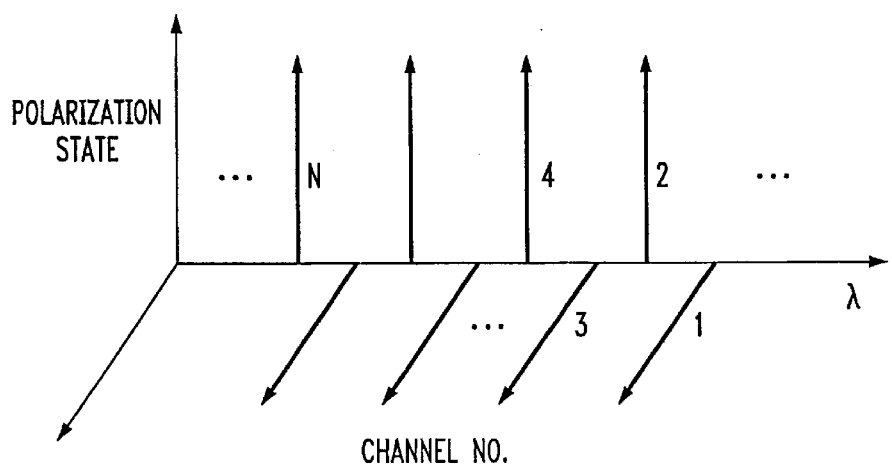
FIG. 1 shows the polarization states of channels contained in the optical signal which is transmitted in accordance with the present invention.

In accordance with the present invention, a WDM optical signal is provided in which the odd-numbered channels have SOPs that are substantially orthogonal to the SOPs of the even-numbered channels. FIG. 1 illustrates this orthogonal relationship of SOPs for the channels in optical output signal at some arbitrary instant in time. The preferred substantially orthogonal relationship between SOPs of odd and even-numbered channels advantageously limits the four-wave mixing products that can be generated in the optical transmission path. Referring to FIG. 1, it will be evident that this desirable result is achieved because neighboring channels, for example channels $\lambda_1$ and $\lambda_2$, are substantially precluded from interacting due to their orthogonal SOPs. Channels sharing the same SOP, for example channels $\lambda_1$ and $\lambda_3$, are separated far enough apart in wavelength such that the amplitude of resultant mixing products is minimal.

Figure 2A:
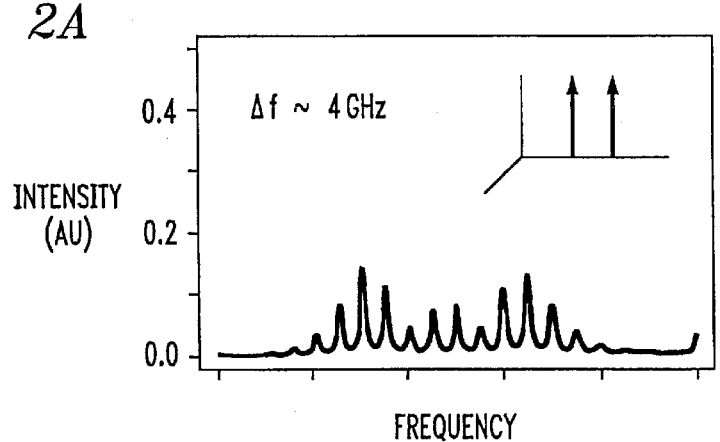
FIG. 2 shows the results of a demonstration that four-wave mixing is reduced when adjacent channels are transmitted with orthogonal SOPs.
Figure 2B:
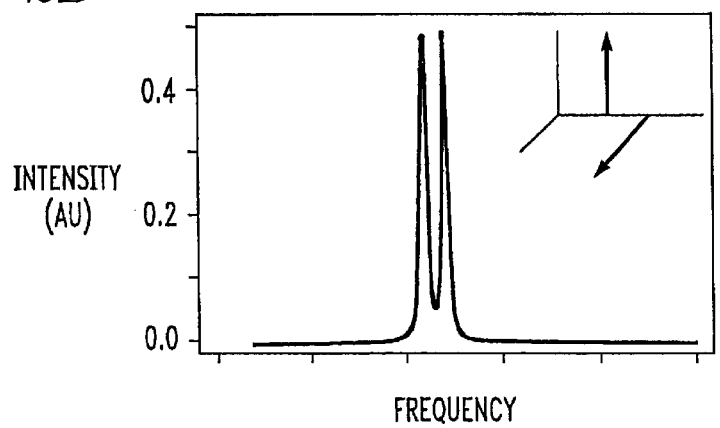

FIG. 2 demonstrates that four-wave mixing is reduced when adjacent channels are transmitted with orthogonal SOPs. The FIG. shows the results of a measurement of degenerate four wave mixing in a 500 km amplifier chain. In FIG. 2(a), light from two CW lasers was launched into an amplifier chain having the same SOP. In FIG. 2(b), light from the two CW lasers were launched into an amplifier chain with orthogonal SOPs. The amplifier chain includes eleven EDFA spans with 45 km of transmission fiber. The average launched power into the transmission spans was +10 dBm. The reduced sidebands in FIG. 2(b) relative to FIG. 2(a) clearly indicate that the effect of four wave mixing is less when the light from the two lasers is launched with orthogonal SOPs.

Figure 3:
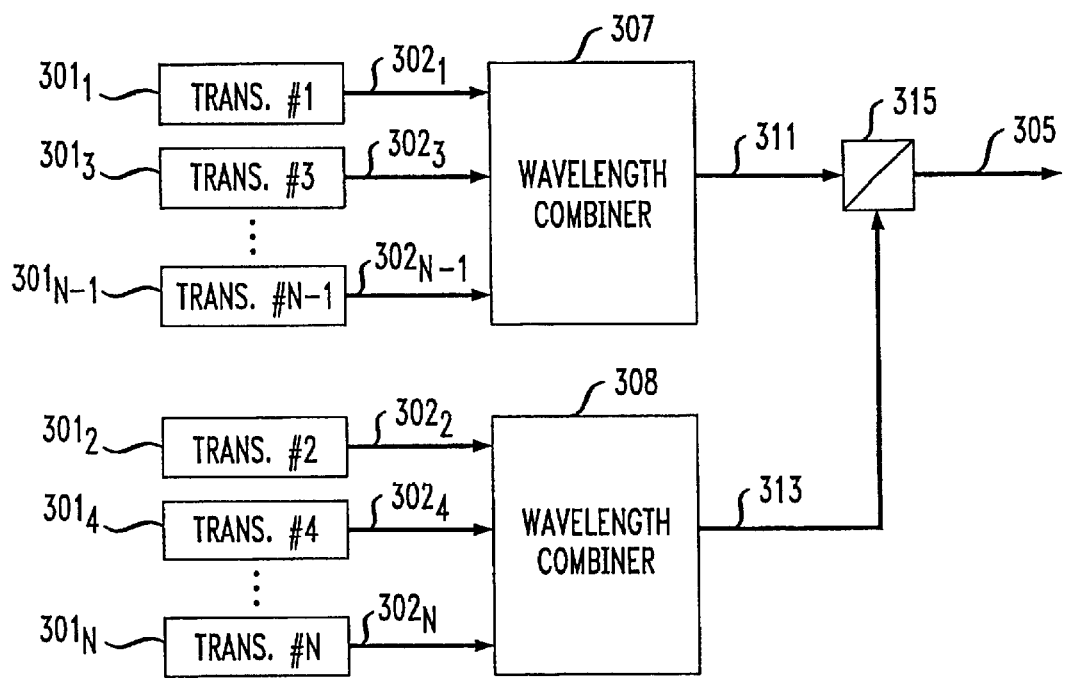
FIG. 3 shows a simplified block diagram of an illustrative embodiment of an optical transmitter constructed in accordance with the present invention.

FIG. 3 is a simplified block diagram of an optical transmitter 300 constructed in accordance with the principles of the invention. Transmitter 300 produces WDM optical signal shown in FIG. 1. As shown, optical transmitter 300 includes a plurality of optical sources $301_1, 301_2, \ldots 301_N$. The plurality of optical sources $301_1, 301_2, \ldots 301_N$ which could be, for example, wavelength-tunable semiconductor lasers, are utilized to generate a plurality of continuous-wave optical signals $302_1, 302_2, \ldots 302_N$ each having a different wavelength $\lambda_1, \lambda_2, \ldots \lambda_N$, respectively, thus defining a plurality of N optical channels. Optical sources $301_1, 301_2, \ldots 301_N$ may be adapted such that optical channels $302_1, 302_2, \ldots 302_N$ have substantially identical optical power. One or more of the optical sources 301 may be adapted so that optical channels 302 carry information supplied by data sources (not shown) using conventional techniques. For discussion purposes, the channels may be sequentially numbered 1, 2, ... N, from lowest to highest wavelength. In this illustrative example of the invention the channel wavelengths are uniformly spaced by, for example, 1 nm. However, as previously mentioned, in other applications of the invention it may be desirable to utilize non-uniform channel wavelength spacing.

The elements shown in FIG. 3 may be coupled using conventional means, for example, optical fibers, which could include polarization maintaining optical fibers where appropriate. Optical transmitter 300 is typically coupled, for example, to an optical transmission path and optical receiver (not shown) to form an optical transmission system. It is noted at the onset that the term "channel" as used herein refers to any optical phenomena that is defined by a unique wavelength. Thus, the term channel may refer to a component of a wavelength division multiplexed optical signal having a plurality of components, where each component has a different wavelength. Moreover, as used herein, the term channel may refer to a monochromatic optical signal.

The plurality of optical sources $301_1, 301_2, \ldots 301_N$, are arranged in sequential order so that optical channels $302_1, 302_2, \ldots 302_N$ are produced in ascending (or descending) wavelength order from $\lambda_1$ to $\lambda_N$. As shown in FIG. 3, the optical sources 301 are grouped into two sets, a first set of odd-numbered optical sources $301_1, 301_3, \ldots 301_{N-1}$ and a second set of even-numbered optical sources $301_2, 301_4, \ldots 301_N$, where N is even. That is, the first set of optical sources produces, in sequential order, the odd-numbered wavelengths $\lambda_1, \lambda_3, \ldots \lambda_{N-1}$ while the second set of optical sources produces, in sequential order, the even-numbered wavelengths $\lambda_2, \lambda_4, \ldots \lambda_N$. Even-numbered wavelengths are directed to a first wavelength combiner 307 while the odd-numbered wavelengths are directed to a second wavelength combiner 308. The wavelength combiners 307 and 308 may comprise, for example, directional couplers, star couplers or wavelength routers. In preferred embodiments of the invention, each set of optical sources imparts a large degree of polarization (i.e., nearly unity) to the signals so that the signals can be subsequently passed through a polarizer without distortion. The orientation of the polarization may be arbitrarily chosen as long as its value is substantially the same among the channels produced by each set of transmitters. If significant loss and distortion can be tolerated, however, the optical sources need not impart a large degree of polarization. The following discussion assumes that a degree of polarization near unity is imparted to the optical signals.

Wavelength combiner 307 forms an output signal 311 comprising N/2 optical channels with each channel being in substantially the same polarization state. Similarly, wavelength combiner 308 forms an output signal 313 comprising N/2 optical channels with each channel being in substantially the same polarization state. The polarization states of output signals 311 and 313 may or may not be the same. Output signals 311 and 313 are directed to a polarization combiner 315 for combining the N/2 channels of output signals 311 and 333. The N/2 channels of output signal 311 are polarized by polarization combiner 315 in a first polarization state and the N/2 channels of output signal 313 are polarized by polarization combiner 315 in a second polarization state that is orthogonal to the first polarization state. The resulting output from the polarization combiner 315 is the desired optical signal 305 shown in FIG. 1. That is, polarization combiner 315 provides an output signal in which adjacent channels are orthogonally polarized. One of ordinary skill in the art will recognize that the multiplexing functionality of the polarization combiner 315 may in the alternative be accomplished by a conventional directional coupler in which the SOP's are carefully adjusted.

Figure 4:
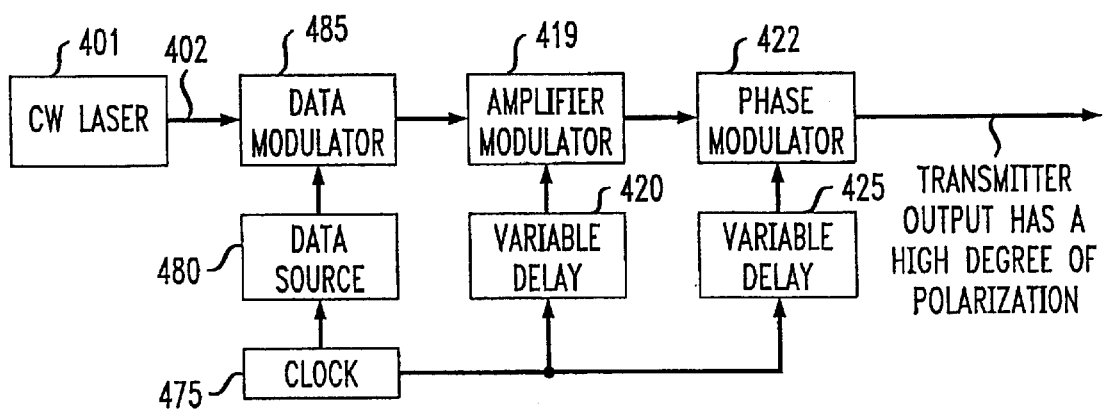
FIG. 4 shows further details of one particular embodiment of one of the optical transmitters shown in FIG. 3, which employs synchronous amplitude and optical phase modulation.

FIG. 4 shows the pertinent details of one particular embodiment of a transmitter show in FIG. 2 for synchronously imparting data, amplitude and phase modulation to the optical signals generated by the optical sources 301 of FIG. 3. As shown, data modulator 485 receives data to be imparted to the optical signal 402 from data source 480 and modulates the optical signal 402 at a frequency determined by clock 475. The clock 475 also drives amplitude modulator 419 via a variable delay line, for example phase shifter 420. Similarly, clock 475 drives phase modulator 422 via variable delay line 425, which may also be a phase shifter, for example. In operation, the clock 475 causes the rate of amplitude and phase modulation to be frequency and phase locked to the rate of data modulation. Variable delay lines 420 and 425 are utilized to adjust the relative timing among the data, amplitude and phase modulation. The manner in which clock 475 drives data modulator 485, amplitude modulator 419, and phase modulator 422 and the operational details of variable delay lines 420 and 425 are further described in U.S. Pat. No. 5,526,162. While FIG. 3 shows one particular modulation format that may be used in connection with the present invention, one of ordinary skill in the art will recognize that the invention is also applicable to optical transmitters that employ other modulation formats such as solitons, for example.

The present invention offers a number of advantages over other optical transmission techniques. For example, transmitters that employ polarization multiplexing with solitons (see U.S. Pat. No. 5,111,322) and transmitters that employ polarization scrambling in WDM systems (see co-pending U.S. patent application Ser. No. 08/355,798) require that the optical channels all operate off a common clock. In other words, such systems require that the channels have a very well defined, fixed phase relationship. In contrast, the present invention does not require a well-defined electrical phase relationship among the channels so that a common clock need not be provided for all the optical channels. As a result, transmitters constructed in accordance with the present invention can use the Synchronous Digital Hierarchy (SDH) input channels, in which the channels may use a common clock frequency but with a random and time-varying phase. Different channels may therefore operate at different bits rates, if desired.

It should be recognized that the pair-wise orthogonal relationship of the optical channels provided in accordance with the present invention will not be maintained over the entire transmission path of the system because of an unavoidable degree of polarization mode dispersion (PMD). However, since current communication systems use relatively small channel spacings and optical fibers having a PMD less than about $0.1 \text{ ps}/\sqrt{\text{km}}$, the correlation between the polarization states of the channels will be high for nearest neighbors. Since nonlinear mixing primarily occurs between neighboring channels, the present technique will nevertheless substantially reduce the effects of four-wave mixing. Moreover, although the degree of polarization of optical signal 105 will be small, PMD may increase it. But again, if low PMD fibers and a large number of channels are employed, the degree of polarization should remain small. If this re-polarization causes excess noise to accumulate from polarization hole-burning in the optical amplifiers, then, in accordance with U.S. Pat. Nos. 5,309,530 and 5,309,535, a relatively slow speed polarization scrambler may be placed at the output of polarization coupler 315.

Figure 5:
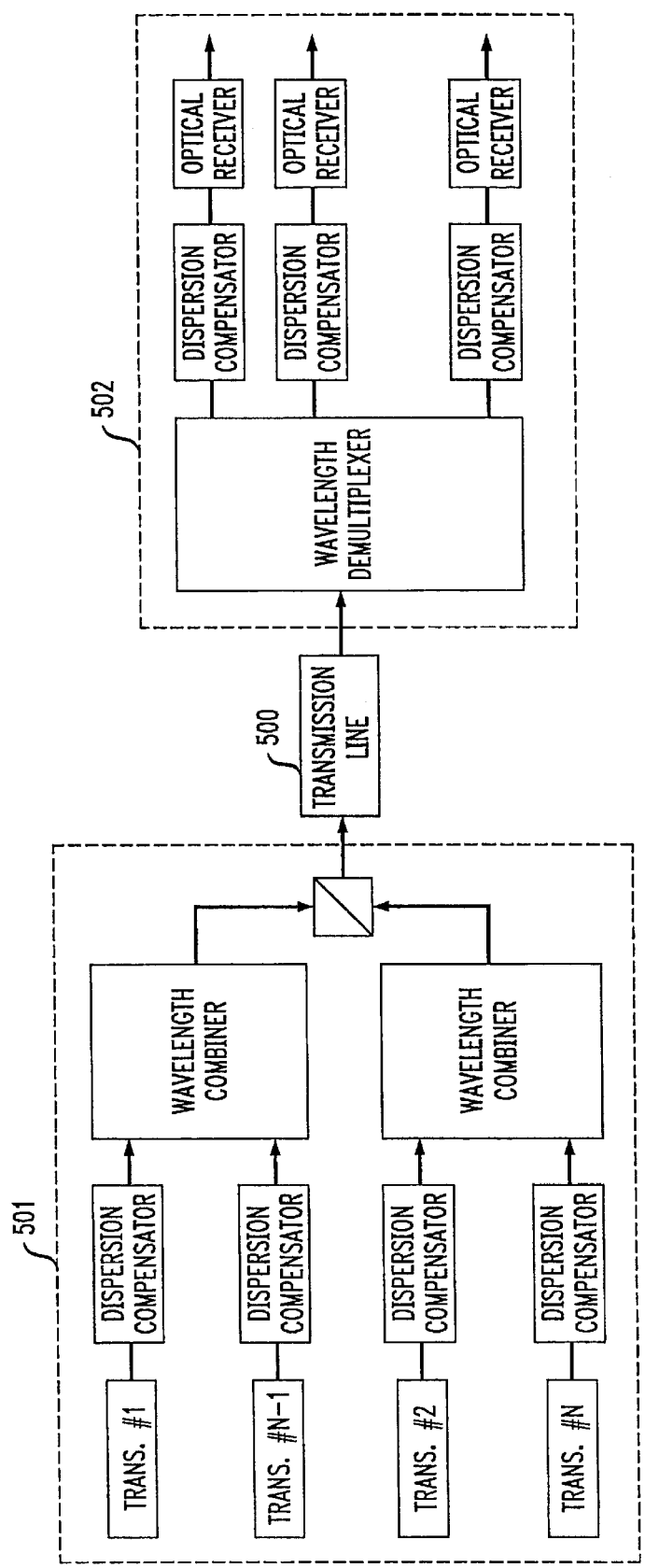
FIG. 5 shows an exemplary optical communication system that may incorporate the transmitters shown in FIGS. 2–3.

FIG. 5 shows a simplified block diagram of an exemplary optical fiber transmission system that employs the transmitter of the present invention. The system includes an optical transmission path 500, a transmitting terminal 501, and a receiving terminal 502. The transmitting terminal 501 corresponds to the transmitter 300 shown in FIG. 3. The optical signal presented by the terminal 501 to the transmission path 500 may comprise a plurality of WDM optical carriers each carrying an SDH signal. The transmission path may include dispersion compensators 505. The transmission path 500 also includes optical amplifiers (not shown), which may be EDFAs, for example, which amplify optical signals in the 1550 wavelength band. In one embodiment of the invention the transmission fibers may be dispersion shifted single-mode fibers with an average zero dispersion wavelength higher than the operating wavelengths of the system.

The invention claimed is:

1. A method of transmitting an optical signal, comprising the steps of:
   generating an optical signal including a plurality of optical channels wherein said plurality of optical channels are sequentially numbered from 1 to N from lowest to highest wavelength;
   orienting a state-of-polarization of predetermined odd-numbered channels to be substantially orthogonal to a state of polarization of predetermined even-numbered channels; and
   transmitting said channels, wherein each of said channels has a non-varying state of polarization.

2. The method as claimed in claim 1 further comprising the step of directing said odd-numbered channels and said even-numbered channels through first and second wavelength combiners, respectively, prior to orienting said states of polarization.

3. The method as claimed in claim 1 wherein said plurality of optical channels are wavelength division multiplexed optical channels.

4. The method as claimed in claim 1 wherein said plurality of optical channels have substantially identical optical powers.

5. The method as claimed in claim 3 wherein the generating step includes the step of generating said odd-numbered channels in a first polarization state and said even-numbered channels in a second polarization state.

6. The method as claimed in claim 4 wherein at least one of said channels is generated by a laser.

7. The method as claimed in claim 6 wherein said laser comprises a wavelength tunable laser.

8. The method as claimed in claim 6 wherein said laser generates a continuous wave optical signal.

9. The method as claimed in claim 2 further including the step of modulating data onto at least one channel of said wavelength division multiplexed optical signal at a predetermined frequency.

10. The method as claimed in claim 9 further comprising the step of re-modulating the amplitude of said at least one channel at said predetermined frequency.

11. The method as claimed in claim 9 further including the step of selectively varying the phase of said at least one channel.

12. The method as claimed in 11 wherein said step of selectively varying the phase includes the step of selectively phase modulating at a frequency equal to said predetermined frequency at which data is modulated.

13. The method as claimed in claim 1 wherein said plurality of optical channels have adjustable power levels.

14. A method of transmitting an optical signal, comprising the steps of:
   generating an optical signal including a plurality of optical channels wherein said plurality of optical channels are sequentially numbered from 1 to N from lowest to highest wavelength;
   orienting a state-of-polarization of predetermined odd-numbered channels to be substantially orthogonal to a state of polarization of predetermined even-numbered channels;
   modulating data onto at least one channel of said wavelength division multiplexed optical signal at a predetermined frequency; and
   re-modulating the amplitude of said at least one channel at said predetermined frequency;
   directing said odd-numbered channels and said even-numbered channels through first and second wavelength combiners, respectively, prior to orienting said states of polarization; and
   transmitting said odd and even channels, using a polarization coupler, wherein each of said channels has a non-varying state of polarization.

15. A method of transmitting an optical signal, comprising the steps of:
   generating an optical signal including a plurality of optical channels wherein said plurality of optical channels are sequentially numbered from 1 to N from lowest to highest wavelength;
   orienting a state-of-polarization of predetermined odd-numbered channels to be substantially orthogonal to a state of polarization of predetermined even-numbered channels;
   modulating data onto at least one channel of said wavelength division multiplexed optical signal at a predetermined frequency; and
   selectively varying the phase of said at least one channel;
   directing said odd-numbered channels and said even-numbered channels through first and second wavelength combiners, respectively, prior to orienting said states of polarization; and
   transmitting said odd and even channels, using a polarization coupler, wherein said odd and even numbered channels have a non-varying state of polarization therebetween.

16. The method as claimed in claim 15 wherein said step of selectively varying the phase includes the step of selectively phase modulating at a frequency equal to said predetermined frequency at which data is modulated.

17. A method of transmitting an optical signal, comprising the steps of:
   generating an optical signal including a plurality of optical channels wherein said plurality of optical channels are sequentially numbered from 1 to N from lowest to highest wavelength; and
   orienting a state-of-polarization of predetermined odd-numbered channels to be substantially orthogonal to a state of polarization of predetermined even-numbered channels, wherein each of said channels have a non-varying state of polarization.

18. The method as claimed in claim 17 further comprising the step of directing said odd-numbered channels and said even-numbered channels through first and second wavelength combiners, respectively, prior to orienting said states of polarization.

19. The method as claimed in claim 18 further including the step of modulating data onto at least one channel of said wavelength division multiplexed optical signal at a predetermined frequency.

20. The method as claimed in claim 19 further comprising the step of re-modulating the amplitude of said at least one channel at said predetermined frequency.

21. The method as claimed in claim 19 further including the step of selectively varying the phase of said at least one channel.

22. The method as claimed in claim 21 wherein said step of selectively varying the phase includes the step of seleceb;normaltively phase modulating at a frequency equal to said predetermined frequency at which data is modulated.

23. The method as claimed in claim 17 wherein said plurality of optical channels are wavelength division multiplexed optical channels.

24. The method as claimed in claim 17 wherein said plurality of optical channels have substantially identical optical powers.

25. The method as claimed in claim 24 wherein at least one of said channels is generated by a laser.

26. The method as claimed in claim 25 wherein said laser comprises a wavelength tunable laser.

27. The method as claimed in claim 25 wherein said laser generates a continuous wave optical signal.

* * * * *

UNITED STATES PATENT AND TRADEMARK OFFICE
CERTIFICATE OF CORRECTION

PATENT NO.     : 6,342,961 B1                                                    Page 1 of 1
DATED          : January 29, 2002
INVENTOR(S)    : Neal S. Bergano and Carl Davidson It is certified that error appears in the above-identified patent and that said Letters Patent is hereby corrected as shown below:

<u>Title page,</u>
Item [57], ABSTRACT, reading as follows:

-- A method and apparatus is provided for transmitting an optical signal. The method includes the step of generating an optical signal that includes a plurality of optical channels, which are sequentially numbered from 1 to N from lowest to highest wavelength. A state-of-polarization of predetermined odd-numbered channels is oriented to be substantially orthogonal to a state of polarization of predetermined even-numbered channels by directing the predetermined odd-numbered channels and the predetermined even-numbered channels through orthogonally polarizing inputs of a polarization coupler. The odd-numbered channels and the even-numbered channels may be directed through first and second wavelength combiners, respectively, prior to orienting their states of polarization. The orthogonal relationship between the states of polarization of odd and even-numbered channels advantageously limits the four-wave mixing products that can be generated in the optical transmitter and the optical transmission path to which it is typically coupled. --

Signed and Sealed this

Sixteenth Day of July, 2002

Attest:

Attesting Officer

JAMES E. ROGAN
*Director of the United States Patent and Trademark Office*